United States Patent [19]
Toida et al.

[11] Patent Number: 5,877,265
[45] Date of Patent: Mar. 2, 1999

[54] SOLID TITANIUM CATALYST COMPONENT FOR OLEFIN POLYMERIZATION, PROCESS FOR PREPARING THE SAME, CATALYST FOR OLEFIN POLYMERIZATION AND PROCESS FOR OLEFIN POLYMERIZATION

[75] Inventors: Tetsuya Toida; Tetsunori Shinozaki; Mamoru Kioka, all of Yamaguchi, Japan

[73] Assignee: Mitsui Cheimcals, Inc., Tokyo, Japan

[21] Appl. No.: 864,356

[22] Filed: May 28, 1997

Related U.S. Application Data

[62] Division of Ser. No. 523,946, Sep. 6, 1995, Pat. No. 5,780, 378, which is a continuation of Ser. No. 113,677, Aug. 31, 1993, abandoned.

[30] Foreign Application Priority Data

| | | | |
|---|---|---|---|
| Aug. 31, 1992 | [JP] | Japan | 4-231732 |
| Apr. 1, 1993 | [JP] | Japan | 5-75513 |
| Aug. 20, 1993 | [JP] | Japan | 5-206345 |

[51] Int. Cl.$^6$ ............. C08F 4/651; C08F 4/654; C08F 10/00
[52] U.S. Cl. ................... 526/125.3; 526/125.6
[58] Field of Search ............ 526/124.9, 125.6, 526/125.3

[56] References Cited

U.S. PATENT DOCUMENTS 4,290,915  9/1981  Toyota et al. ............. 526/125

FOREIGN PATENT DOCUMENTS

| 0361494 | 4/1990 | European Pat. Off. . |
|---|---|---|
| 0437264 | 7/1991 | European Pat. Off. . |
| 0506074 | 9/1992 | European Pat. Off. . |
| 0452156 | 10/1991 | Japan . |
| 218507 | 8/1992 | Japan . |

OTHER PUBLICATIONS

Makromol. Chem. Rapid Commun. vol. 14, No. 2, Feb. 1993, Basel pp. 133–137 XP334499 Eero Iiskola 'A novel MgCl12–supported Zeigler–Natta . . . '.

Database WPI Derwent Publications Ltd., London, GB; An 92–312538 'Catalyst system . . . ' & JPA 4218507 (Mitsui Petrochemical Industries) 10 Aug. 1992.

*Primary Examiner*—Edward J. Smith
*Attorney, Agent, or Firm*—Sherman and Shalloway

[57] ABSTRACT

A solid titanium catalyst component comprising (a) magnesium, (b) titanium, (c) a halogen, (d) a polyether, (e) a hydrocarbon and (f) an electron donor other than the polyether (d) as essential components is provided. Also a process for preparing a solid titanium catalyst component for olefin polymerization, comprising the steps of contacting a halogenated magnesium compound with a compound selected from the group consisting of an alcohol, an ether and an ester in a hydrocarbon solvent to obtain a magnesium compound solution, contacting the magnesium compound solution with a polyether and contacting the resultant solution with a liquid titanium compound is provided. Further, a catalyst for olefin polymerization comprising the above-mentioned solid titanium catalyst component, an organoaluminum compound catalyst component and an electron donor, and a process for polymerizing an olefin using the catalyst for olefin polymerization are also disclosed. By the use of the catalyst for olefin polymerization, an olefin (co)polymer having uniform particle size, less dust quantity, high bulk density and high stereoregularity can be obtained with excellent polymerization activity.

14 Claims, 2 Drawing Sheets

SOLID TITANIUM CATALYST COMPONENT FOR OLEFIN POLYMERIZATION, PROCESS FOR PREPARING THE SAME, CATALYST FOR OLEFIN POLYMERIZATION AND PROCESS FOR OLEFIN POLYMERIZATION

This is a continuing (division) of application Ser. No. 08/523,946, Sep. 6, 1995, now U.S. Pat. No. 5,780,378 which in turn is a continuation of application Ser. No. 08/113,677, filed Aug. 31, 1993, now abandoned.

FIELD OF THE INVENTION

The present invention relates to a solid titanium catalyst component for use as a catalyst in the production of an olefin homopolymer or copolymer and to a process for preparing the solid titanium catalyst component. The present invention also relates to a catalyst for olefin polymerization containing the solid titanium catalyst component and to a process for polymerizing an olefin using the catalyst for olefin polymerization.

BACKGROUND OF THE INVENTION

Known in the art is a catalyst comprising an active magnesium halide and, carried thereon, a titanium compound for use in the production of an olefin polymer, including a homopolymer of ethylene or an α-olefin and a copolymer of ethylene and an α-olefin. In particular, such a known catalyst for olefin polymerization is, for example, comprised of a solid titanium catalyst component comprising magnesium, titanium, a halogen and an electron donor, and an organometallic compound catalyst component.

Various proposals have been made on the process for preparing the above-mentioned solid titanium catalyst component comprising magnesium, titanium, a halogen and an electron donor as essential components. It is also known in the art that a polymer having a high stereoregularity can be produced in high yield by polymerizing an α-olefin having at least three carbon atoms in the presence of the solid titanium catalyst component.

The conventional process for preparing the solid titanium catalyst component includes a process comprising contacting a hydrocarbon solution of a halogenated magnesium compound with a liquid titanium compound to form a solid product. It also includes a process comprising producing a hydrocarbon solution of halogenated magnesium and titanium compounds, followed by formation of a solid product in the presence of at least one electron donor selected from the group consisting of polycarboxylic acids, monocarboxylic esters, polycarboxylic esters, polyhydric compound esters, acid anhydrides, ketones, aliphatic ethers, aliphatic carbonates, alkoxylated alcohols, alcohols having an aryloxy group, organosilicon compounds having an Si—O—C bond and organophosphorus compounds having a P—O—C bond.

In this connection, it is known that the selection of a polycarboxylic acid (e.g., phthalic anhydride) as the electron donor leads to preparation of a solid titanium catalyst component with which an olefin (co)polymer having uniform particle size and less dust quantity can be obtained.

The present inventors have made investigations with a view toward developing a Ti catalyst for olefin polymerization with which an olefin (co)polymer having uniform particle size, less dust quantity and high bulk density can be produced. As a result, they have found that the (co)polymer having uniform particle size, less dust quantity and high bulk density can be produced by the use of a catalyst for olefin polymerization containing a solid titanium catalyst component which comprises, as essential components, (a) magnesium, (b) titanium, (c) a halogen, (d) a compound having at least two ether linkages existing through a plurality of atoms, (e) a hydrocarbon and (f) an electron donor other than the compound (d). Based on this finding, the present invention has been accomplished.

OBJECT OF THE INVENTION

It is, therefore, an object of the present invention to provide a solid titanium catalyst component as a catalyst component with which an olefin (co)polymer having uniform particle size, less dust quantity, high bulk density and high stereoregularity can be obtained with high polymerization activity.

It is another object of the present invention to provide a process for preparing the solid titanium catalyst component.

It is a further object of the present invention to provide a catalyst for olefin polymerization containing the solid titanium catalyst component.

It is a still further object of the present invention to provide a process for olefin polymerization using the catalyst for olefin polymerization.

SUMMARY OF THE INVENTION

The solid titanium catalyst component for olefin polymerization according to the present invention comprises as essential components:

(a) magnesium: 5~35% by weight, (b) titanium: 0.3~10% by weight, (c) a halogen: 30~75% by weight, (d) a compound having at least two ether linkages existing through a plurality of atoms: 0.5~30% by weight, (e) a hydrocarbon: 0.05~20% by weight, and (f) an electron donor other than the compound (d): 0.05~7% by weight.

The first process according to the present invention for preparing a solid titanium catalyst component for olefin polymerization, comprises the steps of:

contacting a halogenated magnesium compound with a compound selected from the group consisting of an alcohol, an ether and an ester in a hydrocarbon solvent to obtain a magnesium compound solution;

contacting the magnesium compound solution with a compound having at least two ether linkages existing through a plurality of atoms; and contacting the resultant solution with a liquid titanium compound.

The second process according to the present invention for preparing a solid titanium catalyst component for olefin polymerization, comprises the steps of:

contacting a halogenated magnesium compound with a compound selected from the group consisting of an alcohol, an ether and an ester in a hydrocarbon solvent to obtain a magnesium compound solution;

contacting the magnesium compound solution with a compound having at least two ether linkages existing through a plurality of atoms;

contacting the resultant solution with a liquid titanium compound and further contacting with an electron donor.

The first catalyst for olefin polymerization according to the present invention comprises:

[I] a solid titanium catalyst component (A) comprising as essential components:
  (a) magnesium: 5~35% by weight,
  (b) titanium: 0.3~10% by weight,
  (c) a halogen: 30~75% by weight,
  (d) a compound having at least two ether linkages existing through a plurality of atoms: 0.5~30% by weight,
  (e) a hydrocarbon: 0.05~20% by weight, and
  (f) an electron donor other than the compound (d): 0.05~7% by weight;
[II] an organoaluminum compound catalyst component (B); and if necessary,
[III] an electron donor (C).

The second catalyst for olefin polymerization according to the present invention comprises:
[I] a prepolymerized catalyst component obtained by prepolymerizing an olefin in the presence of a solid titanium catalyst component (A) and an organoaluminum compound catalyst component (B), said solid titanium catalyst component (A) comprising as essential components:
  (a) magnesium: 5~35% by weight,
  (b) titanium: 0.3~10% by weight,
  (c) a halogen: 30~75% by weight,
  (d) a compound having at least two ether linkages existing through a plurality of atoms: 0.5~30% by weight,
  (e) a hydrocarbon: 0.05~20% by weight, and
  (f) an electron donor other than the compound (d): 0.05~7% by weight; and if necessary,
[II] an organoaluminum compound catalyst component (B) and/or
[III] an electron donor (C).

The process for olefin polymerization according to the present invention comprises polymerizing an olefin in the presence of the above-mentioned first or second catalyst for olefin polymerization.

The catalyst for olefin polymerization according to the present invention shows high polymerization activity.

By the use of the catalyst for olefin polymerization am according to the present invention, an olefin homopolymer or copolymer having uniform particle size, less dust quantity, high bulk density and high stereoregularity can be produced.

DETAILED DESCRIPTION OF THE INVENTION

The solid titanium catalyst component for olefin polymerization, the process for preparing said catalyst component, the catalyst for olefin polymerization and the process for olefin polymerization, according to the present invention, will be described in detail hereinafter.

The meaning of the term "polymerization" used herein is not limited to "homopolymerization" but may comprehend "copolymerization". Also, the meaning of the term "polymer" used herein is not limited to "homopolymer" but may comprehend "copolymer".

Now, description will be made with respect to compounds used in the process for preparing a solid titanium catalyst component according to the present invention, i.e., a halogenated magnesium compound, a compound selected from the group consisting of an alcohol, an ether and an ester, especially an alcohol, a hydrocarbon solvent, a compound having at least two ether linkages existing through a plurality of atoms, a liquid titanium compound and an electron donor (f) other than the compound having at least two ether linkages existing through a plurality of atoms.

Particular examples of the halogenated magnesium compounds for use in the present invention include:
  magnesium dihalides, such as magnesium dichloride, magnesium dibromide, magnesium diiodide and magnesium difluoride;
  alkoxymagnesium halides, such as methoxymagnesium chloride, ethoxymagnesium chloride, isopropoxymagnesium chloride, butoxymagnesium chloride and octoxymagnesium chloride; and
  aryloxymagnesium halides, such as phenoxymagnesium chloride and methylphenoxymagnesium chloride.

These magnesium compounds may be used as a complex or double compound with another metal or as a mixture with another metal compound. Further, a mixture of at least two members selected from the above magnesium compounds may be used in the present invention. Of these, the magnesium halide is preferred, and magnesium chloride is most preferred.

The alcohol for use in the present invention is not particularly limited as long as it can cause the above halogenated magnesium compound to be soluble. Particular examples of such alcohols include:
  aliphatic alcohols, such as ethylene glycol, methyl carbitol, 2-methylpentanol, 2-ethylbutanol, n-heptanol, n-octanol, 2-ethylhexanol, decanol, dodecanol, tetradecyl alcohol, undecenol, oleyl alcohol and stearyl alcohol;
  alicyclic alcohols, such as cyclohexanol and methylcyclohexanol;
  aromatic alcohols, such as benzyl alcohol, methylbenzyl alcohol, isopropylbenzyl alcohol, α-methylbenzyl alcohol and α,α-dimethylbenzyl alcohol; and
  alkoxylated aliphatic alcohols, such as n-butyl cellosolve and 1-butoxy-2-propanol.

Of these, an aliphatic alcohol is preferred, and 2-ethylhexanol is most preferred.

The ethers and esters other than the compound (d) for use in the present invention will be described later.

Particular examples of hydrocarbon solvents used in the present invention include:
  aliphatic hydrocarbons, such as propane, butane, pentane, hexane, heptane, octane, decane, dodecane and kerosine;
  alicyclic hydrocarbons, such as cyclopentane, cyclohexane and methylcyclopentane;
  aromatic hydrocarbons, such as benzene, toluene and xylene;
  halogenated hydrocarbons, such as ethylene chloride and chlorobenzene; and
  mixtures thereof.

Of these, an aliphatic hydrocarbon is preferred, and decane is most preferred.

In the compound having at least two ether linkages existing through a plurality of atoms (hereinafter sometimes referred to as "polyether") used in the present invention, the plurality of atoms may be at least one selected from the group consisting of carbon, silicon, oxygen, nitrogen, phosphorus, boron and sulfur atoms. Preferred are compounds in which a relatively bulky substituent is bonded to the atoms between the ether linkages, said atoms preferably including a plurality of carbon atoms.

The relatively bulky substituents have more than 2 carbon atoms, preferably 3 carbon atoms and have straight-chain structure, branched-chain structure and cyclic structure. More preferably, the bulky substituents have branched-chain structure or cyclic structure.

The bulky substituents have 3~20 carbon atoms, preferably 3~10 carbon atoms and more preferably 3~7 carbon atoms.

Such compounds having at least two ether linkages existing through a plurality of atoms include ether compounds represented by the following formula:

wherein n is an integer satisfying the relationship of $2 \leq n \leq 10$; $R^1$ to $R^{26}$ are substituents each having at least one element selected from carbon, hydrogen, oxygen, halogen, nitrogen, sulfur, phosphorus, boron and silicon; any optional combination of from $R^1$ to $R^{26}$, preferably $R^1$ to $R^{20}$, may form in cooperation a ring other than a benzene ring; and an atom other than a carbon atom may be contained in the main chain.

Particular examples of such compounds having at least two ether linkages existing through a plurality of atoms include:
2-(2-ethylhexyl)-1,3-dimethoxypropane;
2-isopropyl-1,3-dimethoxypropane;
2-butyl-1,3-dimethoxypropane;
2-s-butyl-1,3-dimethoxypropane;
2-cyclohexyl-1,3-dimethoxypropane;
2-phenyl-1,3-dimethoxypropane;
2-cumyl-1,3-dimethoxypropane;
2-(2-phenylethyl)-1,3-dimethoxypropane;
2-(2-cyclohexylethyl)-1,3-dimethoxypropane;
2-(p-chlorophenyl)-1,3-dimethoxypropane;
2-(diphenylmethyl)-1,3-dimethoxypropane;
2-(1-naphthyl)-1,3-dimethoxypropane;
2-(2-fluorophenyl)-1,3-dimethoxypropane;
2-(1-decahydronaphthyl)-1,3-dimethoxypropane;
2-(p-t-butylphenyl)-1,3-dimethoxypropane;
2,2-dicyclohexyl-1,3-dimethoxypropane;
2,2-dicyclopentyl-1,3-dimethoxypropane;
2,2-diethyl-1,3-dimethoxypropane;
2,2-dipropyl-1,3-dimethoxypropane;
2,2-diisopropyl-1,3-dimethoxypropane;
2,2-dibutyl-1,3-dimethoxypropane;
2-methyl-2-propyl-1,3-dimethoxypropane;
2-methyl-2-benzyl-1,3-dimethoxypropane;
2-methyl-2-ethyl-1,3-dimethoxypropane;
2-methyl-2-isopropyl-1,3-dimethoxypropane;
2-methyl-2-phenyl-1,3-dimethoxypropane;
2-methyl-2-cyclohexyl-1,3-dimethoxypropane;
2,2-bis(p-chlorophenyl)-1,3-dimethoxypropane;
2,2-bis (2-cyclohexylethyl)-1,3-dimethoxypropane;
2-methyl-2-isobutyl-1,3-dimethoxypropane;
2-methyl-2-(2-ethylhexyl)-1,3-dimethoxypropane;
2,2-diisobutyl-1,3-dimethoxypropane;
2,2-diphenyl-1,3-dimethoxypropane;
2,2-dibenzyl-1,3-dimethoxypropane;
2,2-bis(cyclohexylmethyl)-1,3-dimethoxypropane;
2,2-diisobutyl-1,3-diethoxypropane;
2,2-diisobutyl-1,3-dibutoxypropane;
2-isobutyl-2-isopropyl-1,3-dimethoxypropane;
2-(1-methylbutyl)-2-isopropyl-1,3-dimethoxypropane;
2-(1-methylbutyl)-2-s-butyl-1,3-dimethoxypropane;
2,2-di-s-butyl-1,3-dimethoxypropane;
2,2-di-t-butyl-1,3-dimethoxypropane;
2,2-dineopentyl-1,3-dimethoxypropane;
2-isopropyl-2-isopentyl-1,3-dimethoxypropane;
2-phenyl-2-isopropyl-1,3-dimethoxypropane;
2-phenyl-2-s-butyl-1,3-dimethoxypropane;
2-benzyl-2-isopropyl-1,3-dimethoxypropane;
2-benzyl-2-s-butyl-1,3-dimethoxypropane;
2-phenyl-2-benzyl-1,3-dimethoxypropane;
2-cyclopentyl-2-isopropyl-1,3-dimethoxypropane;
2-cyclopentyl-2-s-butyl-1,3-dimethoxypropane;
2-cyclohexyl-2-isopropyl-1,3-dimethoxypropane;
2-cyclohexyl-2-s-butyl-1,3-dimethoxypropane;
2-isopropyl-2-s-butyl-1,3-dimethoxypropane;
2-cyclohexyl-2-cyclohexylmethyl-1,3-dimethoxypropane;
2,3-diphenyl-1,4-diethoxybutane;
2,3-dicyclohexyl-1,4-diethoxybutane;
2,2-dibenzyl-1,4-diethoxybutane;
2,3-dicyclohexyl-1,4-diethoxybutane;
2,3-diisopropyl-1,4-diethoxybutane;
2,2-bis(p-methylphenyl)-1,4-dimethoxybutane;
2,3-bis(p-chlorophenyl)-1,4-dimethoxybutane;
2,3-bis(p-fluorophenyl)-1,4-dimethoxybutane;
2,4-diphenyl-1,5-dimethoxypentane;
2,5-diphenyl-1,5-dimethoxyhexane;
2,4-diisopropyl-1,5-dimethoxypentane;
2,4-diisobutyl-1,5-dimethoxypentane;
2,4-diisoamyl-1,5-dimethoxypentane;
3-methoxymethyltetrahydrofuran;
3-methoxymethyldioxane;
3-dibutoxypropane;
1,2-diisobutoxypropane;
1,2-diisobutoxyethane;
1,3-diisoamyloxyethane;
1,3-diamyloxypropane;
1,3-diisoneopentyloxyethane;
1,3-diisoneopentyloxypropane.;
2,2-tetramethylene-1,3-dimethoxypropane;
2,2-pentamethylene-1,3-dimethoxypropane;
2,2-hexamethylene-1,3-dimethoxypropane;
1,2-bis(methoxymethyl)cyclohexane;
2,8-dioxaspiro-5,5-undecane;
3,7-dioxabicyclo-3,3,1-nonane;
3,7-dioxabicyclo-3,3,0-octane;
3,3-diisobutyl-1,5-oxononane;
6,6-diisobutyldioxyheptane;
1,1-dimethoxymethylcyclopentane;
1,1-bis(dimethoxymethyl)cyclohexane;
1,1-bis(methoxymethyl)bicyclo-2,2,1-heptane;
1,1-dimethoxymethylcyclopentane;
2-methyl-2-methoxymethyl-1,3-dimethoxypropane;
2-cyclohexyl-2-ethoxymethyl-1,3-diethoxypropane;
2-cyclohexyl-2-methoxymethyl-1,3-dimethoxypropane;
2,2-diisobutyl-1,3-dimethoxycyclohexane;
2-isopropyl-2-isoamyl-1,3-dimethoxycyclohexane;
2-cyclohexyl-2-methoxymethyl-1,3-dimethoxycyclohexane;
2-isopropyl-2-methoxymethyl-1,3-dimethoxycyclohexane;
2-isobutyl-2-methoxymethyl-1,3-dimethoxycyclohexane;
2-cyclohexyl-2-ethoxymethyl-1,3-dimethoxycyclohexane;
2-cyclohexyl-2-ethoxymethyl-1,3-dimethoxycyclohexane;

2-isopropyl-2-ethoxymethyl-1,3-diethoxycyclohexane;
2-isopropyl-2-ethoxymethyl-1,3-dimethoxycyclohexane;
2-isobutyl-2-ethoxymethyl-1,3-diethoxycyclohexane;
2-isobutyl-2-ethoxymethyl-1,3-dimethoxycyclohexane;
tris(p-methoxyphenyl)phosphine;
methylphenylbis(ethoxymethyl)silane;
diphenylbis(methoxymethyl)silane;
methylcyclohexylbis(methoxymethyl)silane;
di-t-butylbis(methoxymethyl)silane;
cyclohexyl-t-butylbis(methoxymethyl)silane; and
i-propyl-t-butylbis(methoxymethyl)silane.

Of these, 1,3-diethers are preferred. Especially preferred are 2,2-diisobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 2-isopropyl-2-cyclohexyl-1,3-dimethoxypropane, 2-isopropyl-2-s-butyl-1,3-dimethoxypropane, 2,2-diphenyl-1,3-dimethoxypropane and 2-isopropyl-2-cyclopentyl-1,3-dimethoxypropane.

The liquid titanium compounds used in the present invention include for example, halogenated tetravalent titanium compounds of the formula:

$$Ti(OR)_m X_{4-m}$$

wherein R is a hydrocarbon group, X is a halogen atom, and m satisfies the relationship of $0 \leq m < 4$.

Particular examples of such titanium compounds include:
titanium tetrahalides, such as $TiCl_4$, $TiBr_4$ and $TiI_4$;
alkoxytitanium trihalides, such as
$Ti(OCH_3)Cl_3$,
$Ti(OC_2H_5)Cl_3$,
$Ti(On-C_4H_9)Cl_3$,
$Ti(OC_2H_5)Br_3$, and
$Ti(Oiso-C_4H_9)Br_3$;
dialkoxytitanium dihalides, such as
$Ti(OCH_3)_2Cl_2$,
$Ti(OC_2H_5)_2Cl_2$,
$Ti(On-C_4H_9)_2Cl_2$, and
$Ti(OC_2H_5)_2Br_2$;
trialkoxytitanium monohalides, such as
$Ti(OCH_3)_3Cl$,
$Ti(OC_2H_5)_3Cl$,
$Ti(On-C_4H_9)_3Cl$, and
$Ti(OC_2H_5)_3Br$; and
tetraalkoxytitaniums, such as
$Ti(OCH_3)_4$,
$Ti(OC_2H_5)_4$,
$Ti(On-C_4H_9)_4$,
$Ti(Oiso-C_4H_9)_4$, and
$Ti(O-2-ethylhexyl)_4$.

Of these, titanium tetrahalides are preferred, and titanium tetrachloride is especially preferred.

These titanium compounds may be used alone or in combination. Before use, they may be diluted with the above-mentioned hydrocarbon solvent.

The electron donor (f) other than the compound (d) includes alcohols, esters including metallic acid esters and ethers. These electron donor (f) can cause the aforementioned halogenated magnesium compound to be soluble.

Examples of the alcohols which can cause the halogenated magnesium compound to be soluble are shown above.

Examples of the esters which can cause the halogenated magnesium compound to be soluble include organic acid esters having 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide and ethyl carbonate.

Examples of the metallic acid esters which can cause the halogenated magnesium compound to be soluble include titanates, vanadates, niobates and zirconates.

Concrete examples of the titanates include:
orthotitanates, such as methyl orthotitanate, ethyl orthotitanate, n-propyl orthotitanate, i-propyl orthotitanate, n-butyl orthotitanate, i-butyl orthotitanate, n-amyl orthotitanate, 2-ethylhexyl orthotitanate, n-octyl orthotitanate, phenyl orthotitanate and cyclohexyl orthotitanate; and
polytitanates, such as polymethyl titanate, polyethyl titanate, poly-n-propyl titanate, poly-i-propyl titanate, poly-n-butyl titanate, poly-i-butyl titanate, poly-n-amyl titanate, poly-2-ethylhexyl titanate, poly-n-octyl titanate, polyphenyl titanate and polycyclohexyl titanate.

Similarly to the above-exemplified titanates, there can be mentioned, for example, orthovanadates, polyvanadates, orthoniobates, polyniobates, orthozirconates, polyzirconates as examples of the vanadates, the niobates and the zirconates.

Examples of the ethers which can cause the halogenated magnesium compound to be soluble include ethers having 2 to 20 carbon atoms, such as methyl ether, ethyl ether, isopropyl ether, butyl ether, amyl ether, tetrahydrofuran, anisole and diphenyl ether.

The solid titanium catalyst component for olefin polymerization according to the present invention may contain an electron donor (g) other than the compound (d) as an electron donor.

The electron donor (g) includes alcohols other than those described above, phenols, ketones, aldehydes, carboxylic acids, organic acid halides, acid amides, acid anhydrides, alkoxysilanes, ammonias, amines, nitrites, pyridines and isocyanates.

Concrete examples of such electron donor (g) include:
alcohols, such as methanol, ethanol, propanol, butanol, trichloromethanol, trichloroethanol and trichlorohexanol;
phenols having 6 to 20 carbon atoms which may contain a lower alkyl group, such as phenol, cresol, xylenol, ethylphenol, propylphenol, nonylphenol, cumylphenol and naphthol;
ketones having 3 to 15 carbon atoms, such as acetone, methyl ethyl ketone, methyl isobutyl ketone, acetophenone, benzophenone and benzoquinone;
aldehydes having 2 to 15 carbon atoms, such as acetaldehyde, propionaldehyde, octylaldehyde, benzaldehyde, tolualdehyde and naphthaldehyde;
acid halides having 2 to 15 carbon atoms, such as acetyl chloride, benzoyl chloride, toluoyl chloride and anisoyl chloride;
acid amides, such as N,N-dimethylacetamide, N,N-diethylbenzamide and N,N-dimethyltoluamide;
amines, such as trimethylamine, triethylamine, tributylamine, tribenzylamine and tetramethylethylenediamine;

nitriles, such as acetonitrile, benzonitrile and trinitrile;
pyridines, such as pyridine, methylpyridine, ethylpyridine and dimethylpyridine; and
acid anhydrides, such as acetic anhydride, phthalic anhydride and benzoic anhydride.

Preferred examples of organic acid esters are polycarboxylates having a skeleton represented by the following formula:

In the above formulas, $R^1$ is an unsubstituted or substituted hydrocarbon group; each of $R^2$, $R^5$ and $R^6$ is independently hydrogen or an unsubstituted or substituted hydrocarbon group; and each of $R^3$ and $R^4$ is independently hydrogen or an unsubstituted or substituted hydrocarbon group, preferably at least one of them being an unsubstituted or substituted hydrocarbon group. $R^3$ and $R^4$ may be bonded to each other to form a cyclic structure. When the hydrocarbon group of $R^1$ through $R^6$ is substituted, the substituent contains a heteroatom, such as N, O and S, and includes groups of C—O—C, COOR, COOH, OH, $SO_3H$, —C—N—C—and $NH_2$.

Particular examples of polycarboxylates include:
aliphatic polycarboxylates;
alicyclic polycarboxylates;
aromatic polycarboxylates; and
heterocyclic polycarboxylates.

Preferred examples of polycarboxylates are n-butyl maleate, diisobutyl methylmaleate, di-n-hexyl cyclohexenecarboxylate, diethyl nadiate, diisopropyl tetrahydrophthalate, diethyl phthalate, diisobutyl phthalate, di-n-butyl phthalate, di-2-ethylhexyl phthalate and dibutyl 3,4-furandicarboxylate.

Especially preferred of the polycarboxylates are phthalates.

Of the above-mentioned electron donors, the compounds having at least two ether linkages existing through a plurality of atoms are especially preferred.

The solid titanium catalyst component for olefin polymerization according to the present invention is prepared in the following manner.

In the preparation of the solid titanium catalyst component, first, the above-mentioned halogenated magnesium compound is contacted with the above-mentioned alcohol in the above-mentioned hydrocarbon solvent to obtain a homogeneous solution (magnesium compound solution) in which the halogenated magnesium compound is dissolved in a solvent of a mixture of the alcohol and the hydrocarbon.

The alcohol is used in an amount of from 1 to 40 mol, preferably from 1.5 to 20 mol per mol of the halogenated magnesium compound. The hydrocarbon solvent is used in an amount of from 1 to 30 mol, preferably from 1.5 to 15 mol per mol of the halogenated magnesium compound. It is preferred that the contact be effected at a temperature of from 65° to 300° C., especially from 100° to 200° C. for a period of from 15 to 300 minutes, especially from 30 to 120 minutes.

Subsequently, the magnesium compound solution is contacted with the compound having at least two ether linkages existing through a plurality of atoms to obtain a homogeneous solution (magnesium polyether solution).

The compound having at least two ether linkages existing through a plurality of atoms is used in an amount of from 0.01 to 1.0 mol, preferably from 0.1 to 0.5 mol per mol of the halogenated magnesium compound of the magnesium compound solution. It is preferred that the contact be effected at a temperature of from –20° to 300° C., especially from 20° to 200° C. for a period of from 5 to 240 minutes, especially from 10 to 120 minutes.

Thereafter, the magnesium polyether solution is contacted with the liquid titanium compound to obtain a liquid mixture containing the halogenated magnesium compound and the liquid titanium compound (magnesium titanium solution).

The liquid titanium compound is used in an amount of from 2 to 100 gram atoms, preferably from 4 to 50 gram atoms, per gram atom of the magnesium in the magnesium polyether solution. It is preferred that the contact be effected at a temperature of from –70° to 200° C., especially from –70° to 50° C. for a period of from 5 to 300 minutes, especially from 30 to 180 minutes.

Heating of the thus obtained magnesium titanium solution at 20° to 300° C., preferably 50° to 150° C. causes a solid titanium catalyst component to precipitate to form a suspension in the hydrocarbon solvent. It is preferred that the heating be conducted for 10 to 360 minutes, preferably 30 to 300 minutes.

In the present invention, after contacting the magnesium polyether solution with the liquid titanium compound, the magnesium titanium solution may be further contacted with an electron donor. When the contact with the electron donor is effected, it is preferred that the magnesium titanium solution be heated prior to the contact. The compound having at least two ether linkages existing through a plurality of atoms, for use as the electron donor, may be identical with or different from that employed in the preparation of the magnesium polyether solution.

The electron donor is used in an amount of from 0.01 to 5 mol, preferably from 0.1 to 1 mol per mol of the magnesium compound.

In the present invention, the above-mentioned suspension may be subjected to a solid liquid separation through filtration or the like to obtain a solid (solid titanium catalyst component), and if necessary bringing the solid into contact with a liquid titanium compound.

The solid titanium catalyst component thus obtained is preferably washed with hydrocarbon solvent mentioned above.

The obtained solid titanium catalyst component can be suspended in a hydrocarbon solvent and can be used as a catalyst component for olefin polymerization. However, it may be subjected to a solid liquid separation through filtration or the like and drying of the solid before use in olefin polymerization.

The solid titanium catalyst component according to the present invention comprises as essential components:

(a) magnesium: 5~35% by weight,
(b) titanium: 0.3~10% by weight,
(c) a halogen: 30~75% by weight,
(d) a compound having at least two ether linkages existing through a plurality of atoms: 0.5~30% by weight,
(e) a hydrocarbon: 0.05~20% by weight, and
(f) an electron donor other than the compound (d): 0.05~7% by weight.

The electron donor (f) is such a substance as described above, and as the electron donor (f), there can be concretely mentioned alcohols, ethers and esters which can cause the halogenated magnesium compound to be soluble.

In the solid titanium catalyst component for olefin polymerization, it is desired that the magnesium (a) is contained in an amount of from 5 to 35% by weight, preferably from 8 to 30% by weight, more preferably from 10 to 28% by weight, particularly preferably from 12 to 25% by weight; the titanium (b) is contained in an amount of from 0.3 to 10% by weight, preferably from 0.5 to 8% by weight, more preferably from 0.8 to 6% by weight, particularly preferably from 1 to 5% by weight; and the halogen (c) is contained in an amount of from 30 to 75% by weight, preferably from 35 to 75% by weight, more preferably from 38 to 72% by weight, particularly preferably from 40 to 70% by weight. Further, it is desired that the compound (d) having at least two ester linkages existing through a plurality of atoms is contained in an amount of from 0.5 to 30% by weight, preferably from 1 to 27% by weight, more preferably from 3 to 25% by weight, particularly preferably from 5 to 23% by weight; the hydrocarbon (e) is contained in an amount of from 0.05 to 20% by weight, preferably from 0.1 to 15% by weight, more preferably from 1 to 12% by weight, particularly preferably from 2 to 10% by weight; and the electron donor (f) other than the compound (d) is contained in an amount of from 0.05 to 7% by weight, preferably from 0.1 to 5% by weight, more preferably from 0.15 to 4% by weight, particularly preferably from 0.2 to 3% by weight.

If the amount of the hydrocarbon exceeds 20% by weight in the solid titanium catalyst component for olefin polymerization according to the present invention, aggregation of catalyst particles takes place to cause deterioration of properties of the catalyst particles and accordingly polymer particles obtained by the use of the catalyst particles are deteriorated. On the other hand, if the amount of the hydrocarbon is less than 0.05% by weight, not only the properties of catalyst particles are deteriorated to lower the catalytic activity but also the stereoregularity of the polymer obtained is lowered and accordingly polymer particles obtained by the use of the catalyst particles are deteriorated.

The above-mentioned composition is determined by a method comprising washing the obtained solid titanium catalyst component sufficiently with a large amount of hexane, then drying it at room temperature and 0.1 to 1 Torr for more than 2 hours and measuring the composition by means of ICP (atomic-absorption spectroscopy), GC or the like.

The solid titanium catalyst component of the present invention may contain other components than the aforementioned components (a) to (f), such as a carrier, and it is desired that the other components are contained in amounts of not more than 50% by weight, preferably not more than 40% by weight, more preferably not more than 30% by weight, particularly preferably not more than 20% by weight.

The solid titanium catalyst component for olefin polymerization obtained as above is used together with a catalyst component composed of an organometallic compound containing a metal of Groups I to III of the Periodic Table, such as an organoaluminum compound described later, to form a catalyst for olefin polymerization.

Next, the catalyst for olefin polymerization according to the present invention will be described in detail.

The first catalyst for olefin polymerization according to the present invention comprises the solid titanium catalyst component (A), an organoaluminum compound catalyst component (B) and if necessary, an electron donor (C).

Figure 1:
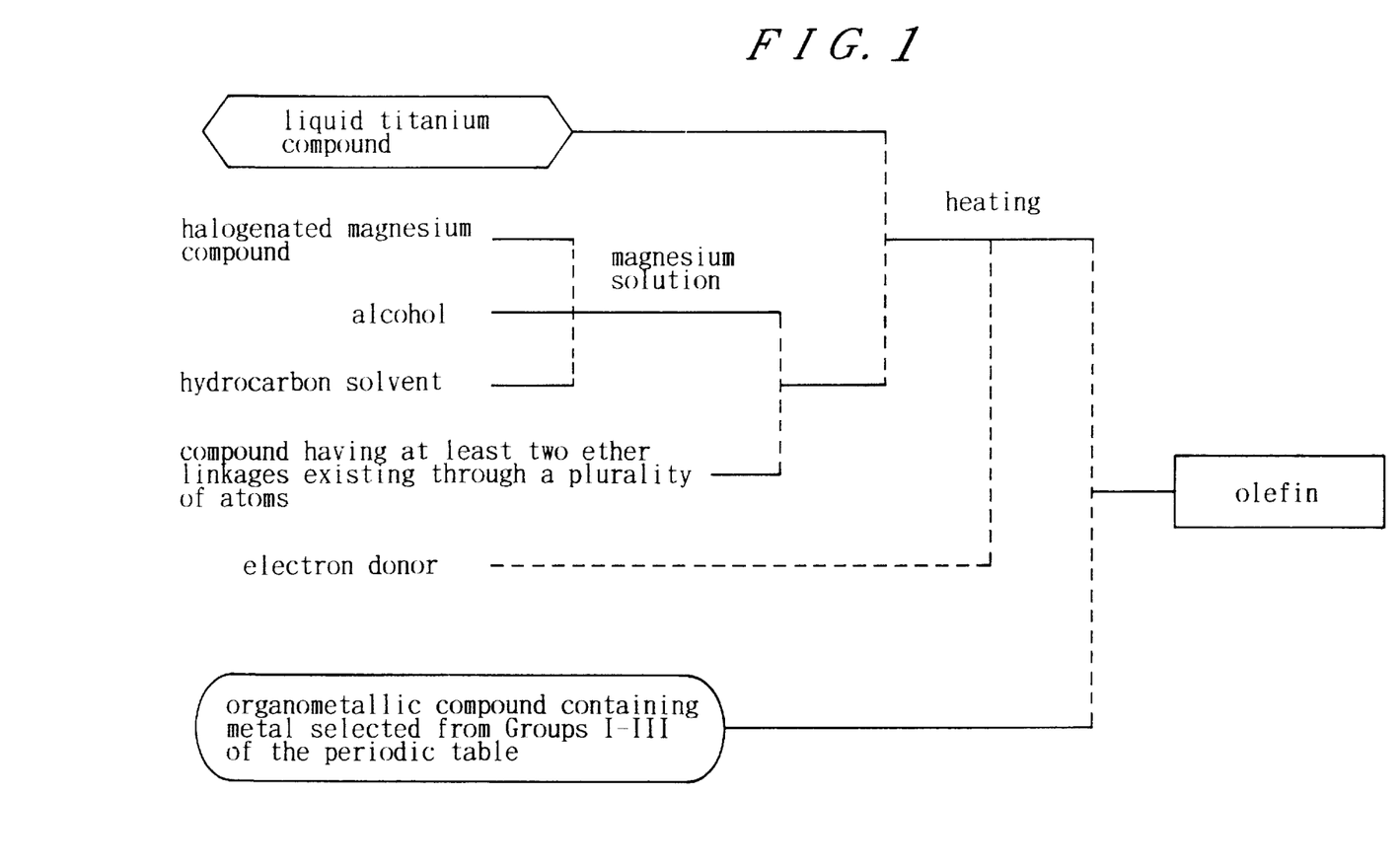
FIG. 1 is an explanatory view of a process for preparing a catalyst for olefin polymerization according to the present invention.
Figure 2:
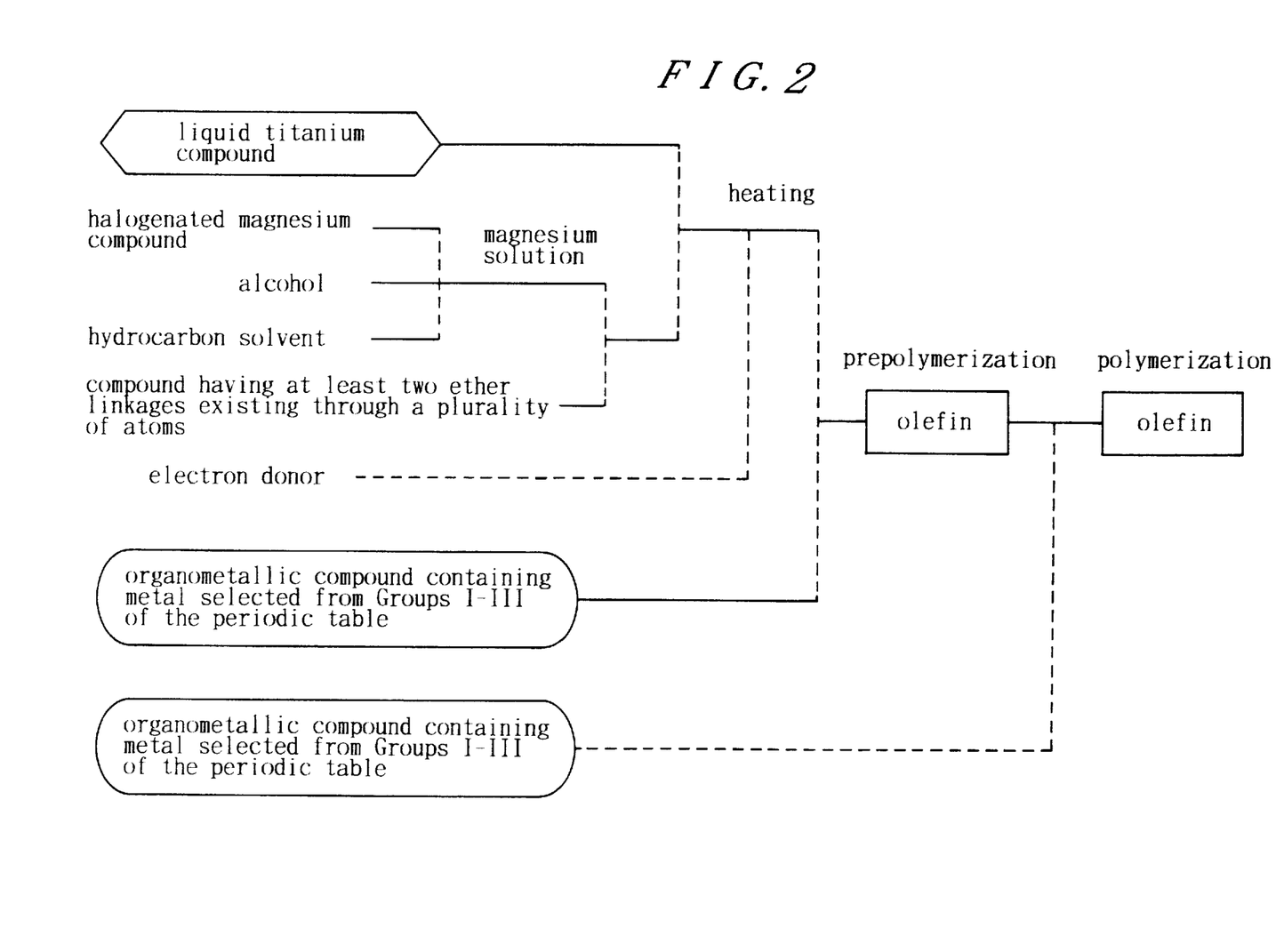
FIG. 2 is an explanatory view of another process for preparing a catalyst for olefin polymerization according to the present invention.

In FIGS. 1 and 2, explanatory views are indicated to illustrate a process for preparing the catalyst for olefin polymerization according to the present invention.

The organoaluminum compound catalyst component (B) used for forming the catalyst for olefin polymerization according to the present invention includes, for example, an organoaluminum compound represented by the following formula:

$$R^a{}_n AlX_{3-n}$$

wherein $R^a$ is a hydrocarbon group having 1 to 12 carbon atoms, X is a halogen or hydrogen, and n is 1 to 3.

In the above formula, $R^a$ is a hydrocarbon group, such as alkyl, cycloalkyl or aryl, having 1 to 12 carbon atoms. Representative examples thereof include methyl, ethyl, n-propyl, isopropyl, isobutyl, pentyl, hexyl, octyl, cyclopentyl, cyclohexyl, phenyl, and tolyl.

Particular examples of such organoaluminum compounds include:

trialkylaluminums, such as trimethylaluminum, triethylaluminum, triisopropylaluminum, triisobutylaluminum, trioctylaluminum, tri-2-ethylhexylaluminum, etc.;

alkenylaluminums, such as isoprenylaluminum, etc.;

dialkylaluminum halides, such as dimethylaluminum chloride, diethylaluminum chloride, diisopropylaluminum chloride, diisobutylaluminum chloride, dimethylaluminum, bromide, etc.;

alkylaluminum sesquihalides, such as methylaluminum sesquichloride, ethylaluminum sesquichloride, isopropylaluminum sesquichloride, butylaluminum sesquichloride, ethylaluminum sesquibromide, etc.;

alkylaluminum dihalides, such as methylaluminum dichloride, ethylaluminum dichloride, isopropylaluminum dichloride, ethylaluminum dibromide, etc.; and alkylaluminum hydride, such as diethylaluminum hydride and diisobutylaluminum hydride, etc.

Also employable as the organoaluminum compound is a compound represented by the following formula:

$$R^a{}_n AlY_{3-n}$$

wherein $R^a$ is as defined above, Y is $-OR^b$, $-OSiR^c{}_3$, $-OAlR^d{}_2$, $-NR^e{}_2$, $-SiR^f{}_3$ or $-N(R^g)AlR^h{}_2$, and n is 1 or 2. $R^b$, $R^c$, $R^d$ and $R^h$ are each methyl, ethyl, isopropyl, isobutyl, cyclohexyl, phenyl, etc.; $R^e$ is hydrogen, methyl, ethyl, isopropyl and phenyl, trimethylsilyl, etc.; and $R^f$ and $R^g$ are each methyl and ethyl, etc.

Particular examples of such organoaluminum compounds include:

(i) compounds of the formula $R^a{}_n Al(OR^b)_{3-n}$, such as dimethylaluminum methoxide, diethylaluminum ethoxide, diisobutylaluminum methoxide, etc.;

(ii) compounds of the formula $R^a{}_n Al(OSiR^c{}_3)_{3-n}$, such as $Et_2Al(OSiMe_3)$, $(iso-Bu)_2Al(OSiMe_3)$, $(iso-Bu)_2Al(OSiEt_3)$, etc.;

(iii) compounds of the formula $R^a{}_n Al(OAlR^d{}_2)_{3-n}$, such as $Et_2AlOAlEt_2$, $(iso-Bu)_2AlOAl(iso-Bu)_2$, etc.;

(iv) compounds of the formula $R^a{}_n Al(NR^e{}_2)_{3-n}$, such as $Me_2AlNEt_2$, $Et_2AlNHMe$, $Me_2AlNHEt$, $Et_2AlN(Me_3Si)_2$ and $(iso-Bu)_2AlN(Me_3Si)_2$, etc.;

(v) compounds of the formula $R^a{}_n Al(SiR^f{}_3)_{3-n}$, such as $(iso-Bu)_2AlSiMe_3$, etc.; and (vi) compounds of the formula $R^a{}_n Al[N(R^g)AlR^h{}_2]_{3-n}$, such as $Et_2AlN(Me)AlEt_2$ and $(iso-Bu)_2AlN(Et)Al(iso-Bu)_2$, etc.

Of the above organoaluminum compounds, those of the formulae $R^a{}_3Al$, $R^a{}_n Al(OR^b)_{3-n}$ and $R^a{}_n Al(OAlR^d{}_2)_{3-n}$ are preferred.

The electron donor (C) used for forming the catalyst for olefin polymerization according to the present invention includes, for example, the electron donor preferably used for preparing the aforesaid solid titanium catalyst component (A) and a silicon compound represented by the following formula (i):

$$R^a{}_n\text{—Si—}(OR^b)_{4-n} \qquad \text{(i)}$$

wherein n is 1, 2 or 3; when n is 1, $R^a$ is a secondary or tertiary hydrocarbon group; when n is 2 or 3, at least one of $R^a$ is a secondary or tertiary hydrocarbon group, and a plurality of $R^a$ may be the same as or different from each other; $R^b$ is a hydrocarbon group having 1 to 4 carbon atoms; and when 4−n is 2 or 3, a plurality of $R^b$ may be the same as or different from each other.

In the silicon compound represented by the above formula (i), the secondary or tertiary hydrocarbon group includes a cyclopentyl group, a substituted cyclopentyl group, a cyclopentenyl group, a substituted cyclopentenyl group, a cyclopentadienyl group, a substituted cyclopentadienyl group and a hydrocarbon group in which a carbon adjacent to Si is a secondary or tertiary carbon.

Examples of the substituted cyclopentyl groups include cyclopentyl groups having an alkyl group, such as 2-methylcyclopentyl group, 3-methylcyclopentyl group, 2-ethylcyclopentyl group, 2n-butylcyclopentyl group, 2,3-dimethylcyclopentyl group, 2,4-dimethylcyclopentyl group, 2,5-dimethylcyclopentyl group, 2,3-diethylcyclopentyl group, 2,3,4-trimethylcyclopentyl group, 2,3,5-trimethylcyclopentyl group, 2,3,4-triethylcyclopentyl group, tetramethylcyclopentyl group and tetraethylcyclopentyl group.

Examples of the substituted cyclopentenyl groups include cyclopentenyl groups having an alkyl group, such as 2-methylcyclopentenyl group, 3-methylcyclopentenyl group, 2-ethylcyclopentenyl group, 2n-butylcyclopentenyl group, 2,3-dimethylcyclopentenyl group, 2,4-dimethylcyclopentenyl group, 2,5-dimethylcyclopentenyl group, 2,3,4-trimethylcyclopentenyl group, 2,3,5-trimethylcyclopentenyl group, 2,3,4-triethylcyclopentenyl group, tetramethylcyclopentenyl group and tetraethylcyclopentenyl group.

Examples of the substituted cyclopentadienyl groups include cyclopentadienyl groups having an alkyl group, such as 2-methylcyclopentadienyl group, 3-methylcyclopentadienyl group, 2-ethylcyclopentadienyl group, 2n-butylcyclopentadienyl group, 2,3-dimethylcyclopentadienyl group, 2,4-dimethylcyclopentadienyl group, 2,5-dimethylcyclopentadienyl group, 2,3-diethylcyclopentadienyl group, 2,3,4-trimethylcyclopentadienyl group, 2,3,5-trimethylcyclopentadienyl group, 2,3,4-triethylcyclopentadienyl group, 2,3,4,5-tetramethylcyclopentadienyl group, 2,3,4,5-tetraethylcyclopentadienyl group, 1,2,3,4,5-pentamethylcyclopentadienyl group and 1,2,3,4,5-pentaethylcyclopentadienyl group.

Examples of the hydrocarbon groups in which a carbon adjacent to Si is a secondary carbon include i-propyl group, s-butyl group, s-amyl group, α-methylbenzyl group; and examples of the hydrocarbon groups in which a carbon adjacent to Si is a tertiary carbon include t-butyl group, t-amyl group, α,α'-dimethylbenzyl group and adamantyl group.

Examples of the silicon compounds represented by the formula (i) wherein n is 1 include trialkoxysilanes such as cyclopentyltrimethoxysilane,
2-methylcyclopentyltrimethoxysilane,
2,3-dimethylcyclopentyltrimethoxysilane,
cyclopentyltriethoxysilane,
iso-butyltriethoxysilane,
t-butyltriethoxysilane,
cyclohexyltrimethoxysilane,
cyclohexyltriethoxysilane,
2norbornanetrimethoxysilane and
2norbornanetriethoxysilane.

Examples of the silicon compounds represented by the formula (i) wherein n is 2 include dialkoxysilanes such as
dicyclopentyldiethoxysilane,
t-butylmethyldimethoxysilane,
t-butylmethyldiethoxysilane,
t-amylmethyldiethoxysilane,
dicyclohexyldimethoxysilane,
cyclohexylmethyldimethoxysilane,
cyclohexylmethyldiethoxysilane and
2norbornanemethyldimethoxysilane.

The silicon compound represented by the formula (i) wherein n is 2 is preferably a dimethoxy compound represented by the following formula (ii):

wherein $R^a$ and $R^c$ are each independently a cyclopentyl group, a substituted cyclopentyl group, a cyclopentenyl group, a substituted cyclopentenyl group, a cyclopentadienyl group, a substituted cyclopentadienyl group or a hydrocarbon group in which a carbon adjacent to Si is a secondary or tertiary carbon.

Examples of the silicon compounds represented by the formula (ii) include:
dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di(2,3,5-trimethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane,
di(2n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane, di(2n-butylcyclopentadienyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl)dimethoxysilane,
di(1,2,3,4,5-pentaethylcyclopentadienyl)dimethoxysilane,
di-t-amyl-dimethoxysilane,
di(αα'-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane, and
isopropyl-s-butyldimethoxysilane.

Examples of the silicon compounds represented by the formula (i) wherein n is 3 include monoalkoxysilanes such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane, and cyclopentyldimethylethoxysilane.

The second catalyst for olefin polymerization according to the present invention comprises:

[I] a prepolymerized catalyst component obtained by prepolymerizing an olefin in the presence of the aforesaid solid titanium catalyst component (A) and the aforesaid organoaluminum compound catalyst component (B), and if necessary

[II] the organoaluminum compound catalyst component (B), and/or

[III] the electron donor (C).

The prepolymerized catalyst component can be prepared by prepolymerizing an olefin in an amount of from 0.1 to 1,000 g, preferably from 0.3 to 500 g, more preferably from 1 to 200 g, based on 1 g of the solid titanium catalyst component (A), in the presence of the solid titanium catalyst component (A) and the organoaluminum compound catalyst component (B).

In the prepolymerization, the catalyst concentration can be higher than that in the polymerization as described later. In the prepolymerization, the concentration of the solid titanium catalyst component is in the range of from about 0.001 to 200 mmol, preferably from about 0.01 to 50 mmol, more preferably from 0.1 to 20 mmol, in terms of titanium atoms per 1 liter of an inert hydrocarbon solvent as described later.

The organoaluminum compound catalyst component is used in such an amount that a prepolymer would be produced in an amount of from 0.1 to 1,000 g, preferably from 0.3 to 500 g, per 1 g of the solid titanium catalyst component. That is, the organoaluminum compound catalyst component is used in an amount of generally from about 0.1 to 300 mol, preferably from about 0.5 to 100 mol, more preferably from 1 to 50 mol, per 1 mol of the titanium atom contained in the solid titanium catalyst component.

The compound having at least two ether linkages existing through a plurality of atoms and such an electron donor (h) as described later may optionally be employed if necessary in the prepolymerization according to the present invention. Each of these is used in an amount of from 0.1 to 50 mol, preferably from 0.5 to 30 mol, more preferably from 1 to 10 mol, per 1 mol of the titanium atom contained in the solid titanium catalyst component.

The prepolymerization can be carried out under mild conditions by incorporating olefin and the catalyst components as mentioned above in an inert hydrocarbon solvent.

Particular examples of such inert hydrocarbon solvents include:

aliphatic hydrocarbons, such as propane, butane, pentane, hexane, heptane, octane, decane, dodecane and kerosine;

alicyclic hydrocarbons, such as cyclopentane, cyclohexane and methylcyclopentane;

aromatic hydrocarbons, such as benzene, toluene and xylene;

halogenated hydrocarbons, such as ethylene chloride and chlorobenzene; and mixtures of these hydrocarbons.

Of these, aliphatic hydrocarbons are preferred.

When the inert hydrocarbon solvent is used, it is preferred that the prepolymerization be conducted in a batch process. The prepolymerization may be conducted in a solvent of the olefin or in a substantially solvent-free system.

The olefin employed in the prepolymerization may be identical with or different from that employed in the polymerization as described later. In particular, it is preferred that the olefin be propylene.

The reaction temperature in the prepolymerization is generally in the range of from about −20° to 100° C., preferably from about −20° to 80° C., more preferably from 0° to 40° C.

A molecular weight regulator, such as hydrogen, can be used in the prepolymerization. It is desirably used in such an amount that the intrinsic viscosity [η] of the polymer obtained by the prepolymerization would be at least about 0.2 dl/g, preferably in the range of from about 0.5 to 10 dl/g, as measured in decalin at 135° C.

As mentioned above, the prepolymerization is preferably carried out until about 0.1 to 1000 g, preferably about 0.3 to 500 g, more preferably 1 to 200 g, of a prepolymer is formed per 1 g of the solid titanium catalyst component (A).

Employable as the electron donor (h) in the prepolymerization are, for example, nitrogen-containing compounds, oxygen-containing compounds and phosphorus-containing compounds.

Particular examples of the nitrogen-containing compounds include:

2,6-substituted piperidines represented by the following formulae:

2,5-substituted piperidines represented by the following formulae:

substituted methylenediamines, such as N,N,N',N'-tetramethylmethylenediamine and N,N,N',N'-tetraethylmethylenediamine; and substituted imidazolidines, such as 1,3-dibenzylimidazolidine and 1,3-dibenzyl-2-phenylimidazolidine.

Particular examples of the phosphorus-containing compounds include phosphites, such as triethyl phosphite, tri-n-propyl phosphite, triisopropyl phosphite, tri-n-butyl phosphite, triisobutyl phosphite, diethyl-n-butyl phosphite and diethylphenyl phosphite.

Particular examples of oxygen-containing compounds include:

2,6-substituted tetrahydropyrans represented by the following formulae:

2,5-substituted tetrahydropyran represented by the following formula:

The catalyst for olefin polymerization according to the present invention can be used either in a process for liquid phase polymerization such as suspension polymerization or in a process for gas phase polymerization.

The olefin employable in the polymerization includes ethylene and olefins having 3 to 20 carbon atoms, such as propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene, cyclopentene, cycloheptene, norbornene, 5-methyl-2norbornene, tetracyclododecene and 2-methyl-1,4,5,8-dimethano-1,2,3,4,4a,5,8,8a-octahydronaphthalene. Also employable are styrene, vinylcyclohexane, dienes, etc.

When the polymerization is carried out in a liquid phase, the same inert hydrocarbon solvents as set forth above with respect to the prepolymerization can be used, and liquid olefins can also be used depending on reaction conditions, as the solvent for polymerization reaction.

In the polymerization of an olefin using the catalyst for olefin polymerization according to the present invention, the solid titanium catalyst component (A) (or prepolymerized catalyst component) is used in an amount of generally from about 0.001 to 0.5 mmol, preferably from about 0.005 to 0.1 mmol, in terms of Ti atoms per 1 liter of polymerization volume. On the other hand, the organoaluminum compound catalyst component (B) is used in an amount of generally from about 1 to 2,000 mol, preferably from about 5 to 500 mol, in terms of metal atoms per 1 mol of the titanium atom of the solid titanium catalyst component (A) (or prepolymerized catalyst component) in the polymerization system. Further, in the polymerization, if necessary, the electron donor (C) is used in an amount of generally from about 0.001 to 10 mol, preferably from 0.01 to 2 mol, per 1 mol of the metal atom of the organoaluminum compound component.

The molecular weight of the polymer to be obtained can be regulated by adding hydrogen in the polymerization, and hence a polymer having a high melt flow rate can be prepared.

In the present invention, the olefin is polymerized at a temperature of generally from about 20° to 200° C., preferably from about 50° to 150° C. under a pressure of generally from about atmospheric pressure to 100 kg/cm$^2$, preferably from about 2 to 50 kg/cm$^2$.

In the process of the present invention, the polymerization can be carried out in any of batch, semi-continuous and continuous manners. Moreover, the polymerization can be carried out in two or more steps having reaction conditions different from each other.

Homopolymerization or copolymerization of an olefin using the above catalyst for olefin polymerization gives a polymer having an intrinsic viscosity [η] of from 0.01 to 100 dl/g, preferably from 0.1 to 50 dl/g.

The thus obtained olefin polymer may optionally be compounded with various additives, such as a thermal stabilizer, a weathering stabilizer, an antistatic agent, an antiblocking agent, a lubricant, a nucleating agent, a pigment, a dye and an organic or inorganic filler.

The catalyst for olefin polymerization according to the present invention may further contain other ingredients useful for olefin polymerization than mentioned above.

EFFECT OF THE INVENTION

The catalyst for olefin polymerization according to the present invention has excellent polymerization activity.

By the use of the catalyst for olefin polymerization according to the present invention, an olefin (co)polymer having uniform particle size, less dust quantity, high bulk density and high stereoregularity can be obtained.

EXAMPLE

The present invention will now be described in more detail with reference to the following examples, but it should be construed that the invention is in no way limited to those examples.

Example 1

[Preparation of solid titanium catalyst component (A)]

95.2 g of anhydrous magnesium chloride, 422 ml of decane and 390.6 g of 2-ethylhexyl alcohol were mixed and heated at 130° C. for 2 hours to obtain a homogeneous solution (magnesium compound solution). Then, 31.1 g of 2-isopentyl-2-isopropyl-1,3-dimethoxypropane was added to the obtained homogeneous solution and stirred at 130° C. for one hour to contact the above-mentioned components.

The resultant homogeneous solution (magnesium polyether solution) was cooled to room temperature, and then 75 g of the homogeneous solution was dropwise added to 200 ml of titanium tetrachloride kept at −20° C. over a period of one hour.

After the addition was completed, the temperature of the resultant liquid mixture (magnesium titanium solution) was elevated to 110° C. over a period of 4 hours.

When the temperature of the liquid mixture reached 110° C., 4.04 g of 2-isopentyl-2-isopropyl-1,3-dimethoxypropane was added thereto, and then the resultant mixture was stirred at the same temperature for 2 hours to effect a contact.

After the completion of the contact, a solid portion was recovered from the reaction mixture by hot filtration. The solid portion was suspended in 275 ml of titanium tetrachloride, and heated at 110° C. for 2 hours to effect a further contact (reaction). After the completion of the further contact, a solid portion was recovered again by hot filtration. The recovered solid portion was well washed with decane and hexane at 110° C. until a free titanium compound was no longer detected in the washing solution.

Thus, a solid titanium catalyst component (A) was obtained. It was stored as a decane slurry. An aliquot portion of the slurry was picked and dried to examine the catalyst composition. As a result of the examination, it was found that the solid titanium catalyst component (A) comprised 2.2% by weight of titanium, 15% by weight of magnesium, 60% by weight of chlorine, 17.3% by weight of 2-isopentyl-2-isopropyl-1,3-dimethoxypropane, 5.4% by weight of decane and 0.2% by weight of 2-ethylhexanol (2-ethylhexyloxy group).

[Polymerization]

750 ml of purified n-hexane was charged into an autoclave with an internal volume of 2 liters, and further 0.75 mmol of triethylaluminum, 0.075 mmol of cyclohexylmethyldimethoxysilane and 0.0075 mmol, in terms of titanium atoms, of the solid titanium catalyst component (A) were charged at 60° C. in a propylene atmosphere.

Thereafter, 200 ml of hydrogen were introduced into the autoclave, and the temperature in the autoclave was elevated to 70° C., at which a propylene polymerization was performed for 2 hours. The pressure during the polymerization was kept at 7 kg/cm$^2$-G.

After the completion of the polymerization, a slurry containing a produced solid was filtered to separate a white solid from a liquid phase portion. The solid was dried to obtain a white powdery solid polymer. The yield was 318.6 g on the dry basis. The polymer had an extraction residue of 98.91% with respect to boiling heptane extraction, an MFR of 3.60 dg/min, and an apparent bulk density of 0.40 g/ml. On the other hand, the liquid phase portion was concentrated to obtain 3.6 g of a solvent-soluble polymer. Hence, the catalyst activity was 42,500 g-PP/mmol-Ti, and I.I. (t.I.I.) in the whole product was 98.4%.

Example 2

[Preparation of prepolymerized catalyst component (B)]

Into a 400 ml four-necked glass reactor equipped with a stirrer were charged 100 ml of purified n-hexane, 3 mmol of triethylaluminum and 1.0 mmol, in terms of titanium atoms, of the solid titanium catalyst component (A) prepared in Example 1, in a nitrogen atmosphere. Propylene was fed into the reactor at a rate of 3.2 liters/hour for one hour to effect a polymerization at 20° C.

At the completion of the feeding of propylene, the reactor was purged with nitrogen, and washing comprising removing a supernatant and introducing purified n-hexane was carried out twice. Thereafter, the product was suspended in purified n-hexane, and entirely transferred into a catalyst bottle to keep the same as a prepolymerized catalyst component (B).

[Polymerization]

750 ml of purified n-hexane was charged into an autoclave with an internal volume of 2 liters, and further 0.75 mmol of triethylaluminum, 0.75 mmol of cyclohexylmethyldimethoxysilane and 0.0075 mmol, in terms of titanium atoms, of the prepolymerized catalyst component (B) were charged at 60° C. in a propylene atmosphere.

Thereafter, 200 ml of hydrogen was introduced into the autoclave, and the temperature in the autoclave was elevated to 70° C., at which a propylene polymerization was performed for 2 hours. The pressure during the polymerization was kept at 7 kg/cm$^2$-G.

After the completion of the polymerization, a slurry containing a produced solid was filtered to separate a white solid from a liquid phase portion. The solid was dried to obtain a white powdery solid polymer. The yield was 398 g on the dry basis. The polymer had an extraction residue of 99.0% with respect to boiling heptane extraction, an MFR of 4.0 dg/min, and an apparent bulk density of 0.42 g/ml.

On the other hand, the liquid phase portion was concentrated to obtain 1.2 g of a solvent-soluble polymer. Hence, the catalyst activity was 53,100 g-PP/mmol-Ti, and I.I. (t.I.I.) in the whole product was 98.7%.

Example 3

[Preparation of solid titanium catalyst component (C)]

The procedure for preparing the solid titanium catalyst component (A) in Example 1 was repeated except for adding 0.81 g of 2-isopentyl-2-isopropyl-1,3-dimethoxypropane to the magnesium titanium solution at 110° C., to obtain a solid titanium catalyst component (C). The results of the composition analysis of the solid titanium catalyst component (C) are set forth in Table 2.

[Polymerization]

The procedure of the polymerization in Example 1 was repeated except for using the solid titanium catalyst component (C). The results are set forth in Table 1.

Example 4

[Prepolymerization of solid titanium catalyst component (C)]

The procedure of the prepolymerization in Example 2 was repeated except for using the solid titanium catalyst component (C), to obtain a prepolymerized catalyst (D).

[Polymerization]

The procedure of the polymerization in Example 2 was repeated except for using the prepolymerized catalyst (D). The results are set forth in Table 1.

Example 5

[Preparation of solid titanium catalyst component (E)]

The procedure for preparing the solid titanium catalyst component (A) in Example 1 was repeated except for conducting the temperature elevation of from −20° C. to 110° C. over a period of 2 hours and adding 0.81 g of 2-isopentyl-2-isopropyl-1,3-dimethoxypropane to the magnesium titanium solution at 110° C., to obtain a solid titanium catalyst component (E). The results of the composition analysis of the solid titanium catalyst component (E) are set forth in Table 2.

[Polymerization]

The procedure of the polymerization in Example 1 was repeated except for using the solid titanium catalyst component (E). The results are set forth in Table 1.

Example 6

[Preparation of solid titanium catalyst component (F)]

The procedure for preparing the solid titanium catalyst component (A) in Example 1 was repeated except for adding 24.9 g of 2-isopentyl-2-isopropyl-1,3-dimethoxypropane to the magnesium chloride solution and adding 1.62 g of 2-isopentyl-2-isopropyl-1,3-dimethoxypropane to the magnesium titanium solution at 110° C., to obtain a solid titanium catalyst component (F). The results of the composition analysis of the solid titanium catalyst component (F) are set forth in Table 2.

[Polymerization]

The procedure of the polymerization in Example 1 was repeated except for using the solid titanium catalyst component (F). The results are set forth in Table 1.

Example 7

[Preparation of solid titanium catalyst component (G)]

The procedure for preparing the solid titanium catalyst component (A) in Example 1 was repeated except for adding 24.0 g of 2-isopentyl-2-isopropyl-1,3-dimethoxypropane to the magnesium chloride solution and adding 1.62 g of 2-isopentyl-2-isopropyl-1,3-dimethoxypropane to the magnesium titanium solution at 110° C., to obtain a solid titanium catalyst component (G). The results of the composition analysis of the solid titanium catalyst component (G) are set forth in Table 2.

[Polymerization]

The procedure of the polymerization in Example 1 was repeated except for using the solid titanium catalyst component (G). The results are set forth in Table 1.

Comparative Example 1

[Preparation of solid titanium catalyst component (H)]

The procedure for preparing the solid titanium catalyst component (A) in Example 1 was repeated except for adding 21.3 g of phthalic anhydride in place of 2-isopentyl-2-isopropyl-1,3-dimethoxypropane to the magnesium chloride solution and adding 5.22 g of diisobutyl phthalate in place of 2-isopentyl-2-isopropyl-1,3-dimethoxypropane to the magnesium titanium solution at 110° C., to obtain a solid titanium catalyst component (H).

[Polymerization]

The procedure of the polymerization in Example 1 was repeated except for using the solid titanium catalyst component (H). The results are set forth in Table 1.

TABLE 1

| No. | Electron Donor | Activity (g-PP / mM-Ti) | t-I.I. (%) | MFR (dl/min) | Apparent Bulk Density (g/ml) |
| --- | --- | --- | --- | --- | --- |
| Ex. 1 | CMMS | 42,500 | 98.4 | 3.6 | 0.40 |
| Ex. 2 | CMMS | 53,100 | 98.7 | 4.0 | 0.42 |
| Ex. 3 | CMMS | 50.600 | 98.1 | 4.0 | 0.39 |
| Ex. 4 | CMMS | 53,100 | 98.7 | 4.0 | 0.42 |
| Ex. 5 | CMMS | 53,900 | 98.2 | 1.9 | 0.42 |
| Ex. 6 | CMMS | 48,600 | 98.5 | 2.2 | 0.42 |
| Ex. 7 | CMMS | 52,500 | 98.4 | 2.3 | 0.44 |
| Comp. Ex. 1 | CMMS | 24,300 | 98.0 | 5.2 | 0.45 |

TABLE 2

| Solid Catalyst Component | Mg | Ti | Cl | IPAMP | Decane | 2-Ethyl-hexanol[*1)] [electron donor (f)] |
|---|---|---|---|---|---|---|
| (A) | 15 | 2.2 | 60 | 17.3 | 5.3 | 0.2 |
| (C) | 15 | 2.7 | 58 | 19.3 | 4.8 | 0.2 |
| (E) | 18 | 2.2 | 59 | 15.3 | 5.3 | 0.2 |
| (F) | 17 | 2.3 | 62 | 11.6 | 6.8 | 0.2 |
| (G) | 16 | 2.4 | 63 | 10.9 | 7.4 | 0.3 |

IPAMP: 2-isopentyl-2-isopropyl-1, 3-dimethoxypropane
[*1)]2-Ethylhexyloxy group

Example 8
[Preparation of solid titanium catalyst component (I)]

95.2 g of anhydrous magnesium chloride, 305 ml of decane and 1600 ml of tetrahydrofuran were mixed and heated to refluxing temperature to obtain a homogeneous solution (magnesium compound solution). Then, 31.1 g of 2-isopentyl-2-isopropyl-1,3-dimethoxypropane was added to the obtained homogeneous solution and stirred at refluxing temperature for one hour to contact the above-mentioned components.

The resultant homogeneous solution (magnesium polyether solution) was cooled to room temperature, and then 75 ml of the homogeneous solution was dropwise added to 200 ml of titanium tetrachloride kept at −20° C. over a period of one hour.

After the addition was completed, the temperature of the resultant liquid mixture (magnesium titanium solution) was elevated to 60° C. over a period of 3 hours.

When the temperature of the liquid mixture reached 60° C., 2.02 g of 2-isopentyl-2-isopropyl-1,3-dimethoxypropane was added thereto, and then the resultant mixture was stirred at the same temperature for 2 hours to effect a contact.

After the completion of the contact, a solid portion was recovered from the reaction mixture by hot filtration. The solid portion was suspended in 275 ml of titanium tetrachloride, and heated at 110° C. for 2 hours to effect a further contact (reaction). After the completion of the further contact, a solid portion was recovered again by hot filtration.

The recovered solid portion was again suspended in 275 ml of titanium tetrachloride, and heated to 110° C. for 2 hours. After the completion of further contact, a solid portion was recovered again by hot filtration. The recovered solid portion was well washed with decane and hexane at 110° C. until a free titanium compound was no longer detected in the washing solution.

Thus, a solid titanium catalyst component (I) was obtained.

The results of the composition analysis of the solid titanium catalyst component (I) are set forth in Table 4.
[Polymerization]

The procedure of the polymerization in Example 1 was repeated except for using the solid titanium catalyst component (I). The results are set forth in Table 3.

Example 9
[Preparation of solid titanium catalyst component (J)]

62.0 g of anhydrous magnesium chloride, 469 ml of decane and 469 ml of tetrabutoxy titanate were mixed and heated at 130° C. for 2 hours to obtain a homogeneous solution (magnesium compound solution). Then, 20.2 g of 2-isopentyl-2-isopropyl-1,3-dimethoxypropane was added to the obtained homogeneous solution and stirred at 130° C. for one hour to contact the above-mentioned components.

The resultant homogeneous solution (magnesium polyether solution) was cooled to room temperature, and then 115 ml of the homogeneous solution was dropwise added to 200 ml of titanium tetrachloride kept at −20° C. over a period of one hour.

After the addition was completed, the temperature of the resultant liquid mixture (magnesium titanium solution) was elevated to 110° C. over a period of 4 hours.

When the temperature of the liquid mixture reached 110° C., 4.04 g of 2-isopentyl-2-isopropyl-1,3-dimethoxypropane was added thereto, and then the resultant mixture was stirred at the same temperature for 2 hours to effect a contact.

After the completion of the contact, a solid portion was recovered from the reaction mixture by hot filtration. The solid portion was suspended in 275 ml of titanium tetrachloride, and heated at 110° C. for 2 hours to effect a further contact (reaction). After the completion of the further contact, a solid portion was recovered again by hot filtration. The recovered solid portion was well washed with decane and hexane at 110° C. until a free titanium compound was no longer detected in the washing solution.

Thus, a solid titanium catalyst component (J) was obtained.

The results of the composition of the solid titanium catalyst component (J) are set forth in Table 4.
[Polymerization]

The procedure of polymerization in Example 1 was repeated except for using the solid titanium catalyst component (J). The results are set forth in Table 3.

Example 10
[Preparation of solid titanium catalyst component (K)]

62.0 g of anhydrous magnesium chloride, 400 ml of decane, 309.6 ml of 2-ethylhexyl alcohol and 228.4 ml of tetrabutoxy titanate were mixed and heated at 130° C. for 2 hours to obtain a homogeneous solution (magnesium compound solution). Then, 20.2 g of 2-isopentyl-2-isopropyl-1, 3-dimethoxypropane was added to the obtained homogeneous solution and stirred at 130° C. for one hour to contact the above-mentioned components.

The resultant homogeneous solution (magnesium polyether solution) was cooled to room temperature, and then 115 ml of the homogeneous solution was dropwise added to 200 ml of titanium tetrachloride kept at −20° C. over a period of one hour.

After the addition was completed, the temperature of the resultant liquid mixture (magnesium titanium solution) was elevated to 110° C. over a period of 4 hours.

When the temperature of the liquid mixture reached 110° C., 4.04 g of 2-isopentyl-2-isopropyl-1,3-dimethoxypropane was added thereto, and then the resultant mixture was stirred at the same temperature for 2 hours to effect a contact.

After the completion of the contact, a solid portion was recovered from the reaction mixture by hot filtration. The solid portion was suspended in 275 ml of titanium tetrachloride, and heated at 110° C. for 2 hours to effect a further contact (reaction). After the completion of the further contact, a solid portion was recovered again by hot filtration. The recovered solid portion was well washed with decane and hexane at 110° C. until a free titanium compound was no longer detected in the washing solution.

Thus, a solid titanium catalyst component (K) was obtained.

The results of the composition of the solid titanium catalyst component (K) are set forth in Table 4.
[Polymerization]

The procedure of polymerization in Example 1 was repeated except for using the solid titanium catalyst component (K). The results are set forth in Table 3.

Comparative Example 2
[Preparation of solid titanium catalyst component (L)]

The procedure for preparing the solid titanium catalyst component in Example 8 was repeated except for adding 21.3 g of phthalic anhydride in place of 2-isopentyl-2-isopropyl-1,3-dimethoxypropane to the magnesium chloride solution and adding 2.61 g of diisobutyl phthalate in place of 2-isopentyl-2-isopropyl-1,3-dimethoxypropane to the magnesium titanium solution at 110° C., to obtain a solid titanium catalyst component (L).

The results of the composition analysis of the solid titanium catalyst component (L) are set forth in Table 4.
[Polymerization]

The procedure of the polymerization in Example 1 was repeated except for using the solid titanium catalyst component (L). The results are set forth in Table 3.

Comparative Example 3
[Preparation of solid titanium catalyst component (M)]

The procedure for preparing the solid titanium catalyst component in Example 9 was repeated except for adding 11.8 g of phthalic anhydride in place of 2-isopentyl-2-isopropyl-1,3-dimethoxypropane to the magnesium chloride solution and adding 3.39 g of diisobutyl phthalate in place of 2-isopentyl-2-isopropyl-1,3-dimethoxypropane to the magnesium titanium solution at 110° C., to obtain a solid titanium catalyst component (M).

The results of the composition analysis of the solid titanium catalyst component (M) are set forth in Table 4.
[Polymerization]

The procedure of the polymerization in Example 1 was repeated except for using the solid titanium catalyst component (M). The results are set forth in Table 3.

Comparative Example 4
[Preparation of solid titanium catalyst component (N)]

The procedure for preparing the solid titanium catalyst component in Example 10 was repeated except for adding 11.8 g of phthalic anhydride in place of 2-isopentyl-2-isopropyl-1,3-dimethoxypropane to the magnesium chloride solution and adding 3.39 g of diisobutyl phthalate in place of 2-isopentyl-2-isopropyl-1,3-dimethoxypropane to the magnesium titanium solution at 110° C., to obtain a solid titanium catalyst component (N).

The results of the composition analysis of the solid titanium catalyst component (N) are set forth in Table 4.
[Polymerization]

The procedure of the polymerization in Example 1 was repeated except for using the solid titanium catalyst component (N). The results are set forth in Table 3.

TABLE 3

| No. | Electron Donor | Activity (g-PP / mM-Ti) | t-I.I. (%) | MFR (dl/min) | Apparent Bulk Density (g/ml) |
|---|---|---|---|---|---|
| Ex. 8 | CMMS | 38,600 | 98.0 | 4.5 | 0.40 |
| Ex. 9 | CMMS | 39,800 | 98.2 | 5.0 | 0.41 |
| Ex. 10 | CMMS | 40,200 | 98.1 | 4.2 | 0.40 |
| Comp. Ex. 2 | CMMS | 20,100 | 97.6 | 6.1 | 0.42 |
| Comp. Ex. 3 | CMMS | 21,500 | 97.7 | 6.2 | 0.41 |
| Comp. Ex. 4 | CMMS | 22,000 | 97.5 | 7.0 | 0.40 |

TABLE 4

| Solid Catalyst Component | Mg | Ti | Cl | IPAMP | Decane | Electron donor (f) |
|---|---|---|---|---|---|---|
| (I) | 18 | 2.0 | 62 | 15.2 | 2.6 | 0.2 [1] |
| (J) | 16 | 3.0 | 58 | 17.6 | 5.2 | 0.2 [2] |
| (K) | 17 | 3.2 | 59 | 16.3 | 4.2 | 0.3 [3] |

[1] Tetrahydrofuran
[2] Tetrabutoxy group
[3] Tetrabutoxy group + 2-ethylhexyloxy group

What is claimed is:

1. A process for olefin polymerization comprising polymerizing an olefin in the presence of a catalyst for olefin polymerization comprising (I) solid titanium catalyst component (A) comprising as essential components:
  (a) from 10 to 28% by weight of magnesium;
  (b) from 0.8 to 6% by weight of titanium;
  (c) from 38 to 72% by weight of halogen;
  (d) from 3 to 25% by weight of compound having at least two ether linkages existing through a plurality of atoms, said plurality of atoms comprising at least one atom selected from the group consisting of carbon, silicon, oxygen, nitrogen, phosphorous, boron and sulfur atoms;
  (e) from 2 to 10% by weight of hydrocarbon; and
  (f) from 0.15 to 4% by weight of electron donor other than compound (d), (II) organoaluminum compound catalyst component (B), and, optionally, (III) electron donor catalyst component (C);
  wherein the solid titanium catalyst component (A) is the product obtained by:
    (1) contacting in hydrocarbon solvent, halogenated magnesium compound with electron donor compound selected from the group consisting of alcohol, ether and ester, wherein the amount of electron donor is from 1 to 40 mole per mole of halogenated magnesium compound and the amount of hydrocarbon solvent is from 1 to 30 mole per mole of halogenated magnesium compound, to obtain a magnesium compound solution;
    (2) contacting the magnesium solution with compound (d) in an amount of from 0.01 to 1.0 mol per mole of halogenated magnesium compound, to obtain magnesium polyether solution;
    (3) contacting the magnesium polyether solution with liquid titanium compound in an amount of from 2 to 100 gram atoms per gram atom of magnesium in the magnesium polyether solution,
  wherein said electron donor compound used to prepare the magnesium compound solution is different from compound (d).

2. The process as claimed in claim 1 wherein the electron donor (f) other than the compound (d) is selected from the group consisting of alcohols, esters including metallic acid esters and ethers other than the compound having at least two ether linkages existing through the plurality of atoms.

3. The process of claim 1 wherein electron donor (C) is present.

4. The process of claim 3 wherein electron donor (C) comprises a silicon compound represented by the following formula (i):

$$R^a{}_n\text{—Si—}(OR^b)_{4-n} \qquad \text{(i)}$$

wherein
n is 1, 2 or 3;
$R^a$ is a secondary or tertiary hydrocarbon group, which may be the same or different when n is 2 or 3; and
$R^b$ is a hydrocarbon group having 1 to 4 carbon atoms, which may be the same or different when 4−n is 2 or 3.

5. The solid titanium catalyst component of claim 1, wherein the compound (d) is represented by the following formula:

wherein n is an integer of $2 \leq n \leq 10$, $R^1$ to $R^{26}$ are each independently a substituent having at least one element selected from the group consisting of carbon, hydrogen, oxygen, halogen, nitrogen, sulfur, phosphorous, boron and silicon, and two members of $R^1$ to $R^{26}$ may form together a ring other than a benzene ring and the main chain of the compound may contain an atom other than carbon.

6. The process of claim 1 which comprises polymerizing propylene in the liquid phase in an inert hydrocarbon solvent in the presence of from about 0.001 to 0.5 mmol, in terms of titanium atoms, per liter of the polymerization volume, of solid titanium catalyst component (A); from about 1 to 2000 mol of the organoaluminum compound catalyst component (B) in terms of metal atom, per mol of titanium atom in component (A); and from about 0.001 to 10 mol, per mol of metal atom of the component (B), of electron donor (C).

7. The process of claim 6 wherein the polymerization is carried out at a temperature of from about 20° to 200° C. and a pressure of from about atmospheric pressure to 100 kg/cm².

8. The process according to claim 1 wherein the solid titanium catalyst component is obtained by said process which further comprises (4) contacting the solution from step (3) with electron donor compound which may be the same or different from compound (d) used in step (2)to prepare the magnesium polyether solution.

9. A process for olefin polymerization comprising polymerizing an olefin in the presence of a catalyst for olefin polymerization comprising:
(I) a prepolymerized catalyst component obtained by prepolymerizing olefin in the presence of solid titanium catalyst component (A) and organoaluminum compound catalyst component (B),
said solid titanium catalyst component (A) comprising as essential components:
(a) from 10 to 28% by weight of magnesium;
(b) from 0.8 to 6% by weight of titanium;
(c) from 38 to 72% by weight of halogen;
(d) from 3 to 25% by weight of compound having at least two ether linkages existing through a plurality of atoms, said plurality of atoms comprising at least one atom selected from the group consisting of carbon, silicon, oxygen, nitrogen, phosphorous, boron and sulfur atoms;
(e) from 2 to 10% by weight of hydrocarbon;
(f) from 0.15 to 4% by weight of electron donor other than the compound (d);
wherein the solid titanium catalyst component is the product obtained by:
(1) contacting in hydrocarbon solvent, halogenated magnesium compound with electron donor compound selected from the group consisting of alcohol, ether and ester, wherein the amount of electron donor is from 1 to 40 mole per mole of halogenated magnesium compound and the amount of hydrocarbon solvent is from 1 to 30 mole per mole of halogenated magnesium compound, to obtain a magnesium compound solution;
(2) contacting the magnesium solution with compound (d) in an amount of from 0.01 to 1.0 mol per mole of halogenated magnesium compound, to obtain magnesium polyether solution;
(3) contacting the magnesium polyether solution with liquid titanium compound in an amount of from 2 to 100 gram atoms per gram atom of magnesium in the magnesium polyether solution,
wherein said electron donor compound used to prepare the magnesium compound solution is different from said compound (d); and, at least one of (II) and (III):
(II) organoaluminum compound catalyst component;
(III) electron donor (C).

10. The process as claimed in claim 9 wherein the electron donor (f) other than the compound (d) is selected from the group consisting of alcohols, esters, including metallic acid esters and ethers other than the compound having at least two ether linkages existing through a plurality of atoms.

11. The process of claim 9 wherein (II) organoaluminum compound catalyst component is present.

12. The process of claim 9 wherein (III) electron donor (C) is present.

13. The process of claim 12 wherein electron donor (C) comprises a silicon compound represented by the following formula (i):

$$R^a{}_n\text{—Si—}(OR^b)_{4-n} \qquad \text{(i)}$$

wherein
n is 1, 2 or 3;
$R^a$ is a secondary or tertiary hydrocarbon group, which may be the same or different when n is 2 or 3; and
$R^b$ is a hydrocarbon group having 1 to 4 carbon atoms, which may be the same or different when 4−n is 2 or 3.

14. The olefin polymerization process according to claim 9 wherein the steps for preparing the solid titanium catalyst component (A) further comprises (4) contacting the solution from step (3) with electron donor compound (d) which may be the same or different from compound (d) used in step (2) to prepare the magnesium polyether solution.

\* \* \* \* \*